United States Patent [19]

Kimura et al.

[11] Patent Number: 4,545,537
[45] Date of Patent: Oct. 8, 1985

[54] SHREDDER WITH INCREASED REVERSED UNLOCKING TORQUE

[75] Inventors: Masahiro Kimura, Shiga; Yoshitaka Hayashi; Ryohei Yoshida, both of Youkaichi, all of Japan

[73] Assignee: Matsushita Electric Industrial Company, Limited, Japan

[21] Appl. No.: 356,924

[22] Filed: Mar. 10, 1982

[30] Foreign Application Priority Data

Mar. 11, 1981 [JP] Japan ................................. 56-34413
Mar. 13, 1981 [JP] Japan ................................. 56-36204

[51] Int. Cl.⁴ .............................................. B02C 25/00
[52] U.S. Cl. ....................................... 241/36; 241/236
[58] Field of Search ................ 241/36, 101.2, 235, 241/236, 227, 242, 243

[56] References Cited

U.S. PATENT DOCUMENTS

| | | | |
|---|---|---|---|
| 3,608,837 | 9/1971 | Panning | 241/36 |
| 3,703,970 | 11/1972 | Benson | 241/36 X |
| 4,026,480 | 5/1977 | Meyers | 241/36 X |
| 4,034,918 | 7/1977 | Culbertson et al. | 241/36 |

FOREIGN PATENT DOCUMENTS

| | | |
|---|---|---|
| 1088327 | 9/1960 | Fed. Rep. of Germany ........ 241/36 |
| 1167173 | 4/1964 | Fed. Rep. of Germany . |
| 1611752 | 5/1972 | Fed. Rep. of Germany . |
| 2361749 | 6/1975 | Fed. Rep. of Germany ........ 241/36 |
| 2819358 | 11/1978 | Fed. Rep. of Germany . |
| 1295833 | 7/1960 | France . |
| 1579664 | 11/1980 | United Kingdom . |

Primary Examiner—Mark Rosenbaum
Attorney, Agent, or Firm—Lowe, King, Price & Becker

[57] ABSTRACT

A shredder comprises a cutter unit including a pair of rotary cutters for shredding a material therebetween while the rotary cutters are rotating in a normal direction, a reversible motor for rotating the rotary cutters through a speed reducer, and a switch unit for selectively causing the motor to rotate the rotary cutter in the normal direction or reversing the motor to rotate the rotary cutters in a reverse direction to remove the material from the rotary cutters when the material is jammed in the rotary cutters. An electrical control circuit is responsive to actuation of the switch unit for enabling the motor to produce a larger torque while rotating in the reverse direction than the torque produced while rotating in the normal direction, thereby reliably releasing the rotary cutters from biting engagement with the material when jammed. The switch unit has means for generating a time delay while switching between rotation of the motor in the normal direction and rotation of the motor in the reverse direction, so that the motor and the speed reducer are protected against an undue load when starting to rotate in the reverse direction.

9 Claims, 10 Drawing Figures

SHREDDER WITH INCREASED REVERSED UNLOCKING TORQUE

BACKGROUND OF THE INVENTION

The present invention relates to a shredder for cutting of wastepaper into small pieces or shreds.

Known shredders generally include a casing having an inlet opening for receiving material to be shredded, such as documents, and an outlet opening for discharging the shredded material, a shredding mechanism composed of a motor, a speed reducer and a rotary cutter, and a switch means for changing directions of rotation of the motor selectively to actuate the rotary cutter to cut off the material or release the rotary cutter from locking or biting engagement with the material being shredded.

The switch means is operated to unlock the rotary cutter, when the rotary cutter, while in operation, is subjected to an undue load and locked against rotation because, for example, an increased number of sheets of paper are supplied to the rotary cutter. More specifically, if the rotary cutter remained locked while being actuated, the motor for driving the rotary cutter would continue to be excessively loaded and tend to be burned out or otherwise damaged. When the rotary cutter is locked against rotation, therefore, the switch means should immediately be actuated to de-energize the motor and then to reverse the motor and the rotary cutter to displace the material out of locking engagement with the rotary cutter and to return the material to the inlet opening. The switch means in the conventional shredder has a switch for rotating the motor in a normal direction and another switch for rotating the motor in a reverse direction. In operation, one or the other of the switches is operated at any one time to start the motor and the rotary cutter or to change the direction of rotation of the same.

When the rotary cutter is to be reversed in rotation so as to be unlocked out of the material being shredded, the motor is required to produce a torque large enough to release the rotary cutter from biting engagement with the material and to force the freed material through a passage back to the inlet opening. The force thus required to release the rotary cutter and to move back the material is imposed on the motor as a load during reverse rotation of the rotary cutter.

However, the motor in prior shredders is designed to produce a constant torque irrespective of whether the motor is rotated in the normal or the reverse direction. Such a motor is likely to fail to free or unlock the rotary cutter when the material is jammed in the rotary cutter, and hence tends to be placed continuously under an undue load. Unlocking the rotary cutter thus requires temporary de-energization of the motor and manual removal of the material out of locking engagement with the rotary cutter. The manual material removing operation, however, is laborious, tedious and time-consuming.

With the conventional shredders, the motor is temporarily de-energized and then rotated in the reverse direction when the reverse rotation switch is turned on to release the rotary cutter. The reverse rotation switch is constructed such that it allows continuous rapid movement of a switch contact from a motor de-energization position to a reverse rotation position without experiencing a time delay. When the reverse rotation switch is actuated to move the contact to the reverse rotation position speedily in a single stroke, the motor while rotating in the normal direction is subjected to an abrupt force tending to rotate the motor in the opposite direction, whereupon the motor and the speed reducer undergoes damaging stresses. At times, electrical circuits for rotating the motor in the normal and reverse directions are simultaneously short-circuited.

SUMMARY OF THE INVENTION

It is an object of the present invention to provide a shredder having a rotary cutter which can be released reliably from a locking or biting engagement with material being shredded.

Another object of the present invention is to provide a shredder having electrical means for enabling a motor to produce a larger torque when rotating in a revese direction than a torque generated when rotating in a normal direction.

Still another object of the present invention is to provide a shredder having mechanical means for providing a larger reduction gear ratio of a speed reducer when rotating in a reverse direction than a reduction gear ratio when rotating in a normal direction.

A still further object of the present invention is to provide a shredder having a switch unit which can provide a time delay while switching between different directions of rotation of a motor, to thereby prevent the motor and its associated speed reducer from experiencing undue stresses.

According to the present invention, a shredder comprises a housing, a pair of rotary cutters disposed in the housing for shredding a material therebetween, a speed reducer disposed in the housing, a motor mounted in the husing and rotatable in one direction for rotating the rotary cutters through the speed reducer in a normal direction to shred the material and also rotatable in the opposite direction for rotating the rotary cutters through the speed reducer in a reverse direction to unload the material from the rotary cutters, a switch unit disposed in the housing for rotating the motor selectively in the one and in the opposite directions, and means for rotating the rotary cutters with a larger torque in the reverse direction than that in the normal direction. The means comprises an electrical control circuit including main and auxiliary windings of the motor and a capacitor or capacitors connected to the main and auxiliary windings and selectably coupled by the switch unit to an a.c. power supply such that the phase difference between an electric current flowing through the main winding and that flowing through the auxiliary winding will be larger during rotation of the motor in the opposite direction than during rotation thereof in said one direction. The switch unit also includes means for producing a time delay while switching between normal motor rotation and reverse motor rotation to protect the motor and the speed reducer from an excessive stress when starting to rotate in the reverse direction.

The above and other objects, features and advantages of the present invention will become more apparent from the following description when taken in conjunction with the accompanying drawings in which certain preferred embodiments are shown by way of illustrative example.

DESCRIPTION OF THE PREFERRED EMBODIMENTS

Figure 1:
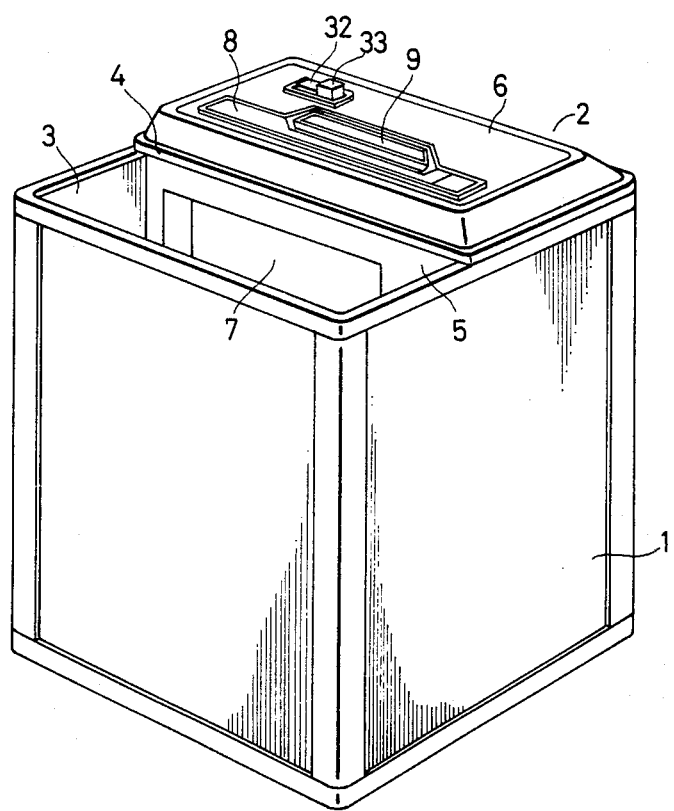
FIG. 1 is a perspective view of a shredder according to the present invention.

As shown in FIG. 1, a shredder according to the present invention comprises a dust box 1 having an upper opening, and a shredder proper 2 mounted in the upper opening in the dust box 1. The shredder proper 2 has a width smaller than the width of the dust box 2, leaving a slot 3 through which other trash can be thrown into the dust box 1 than shreds produced by the shredder proper 2. The trash and shreds collected in the dust box 1 can be discarded therefrom with the shredder proper 2 removed.

Figure 2:
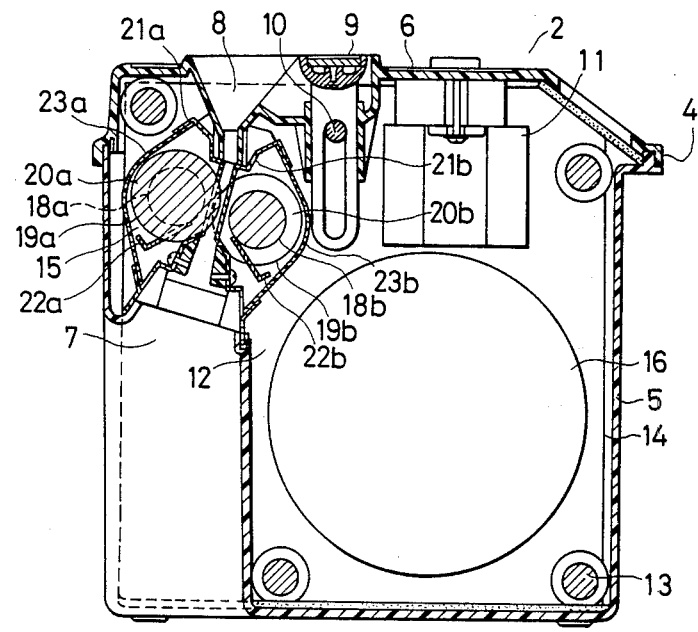
FIG. 2 is a vertical cross-sectional view of the shredder shown in FIG. 1.
Figure 3:
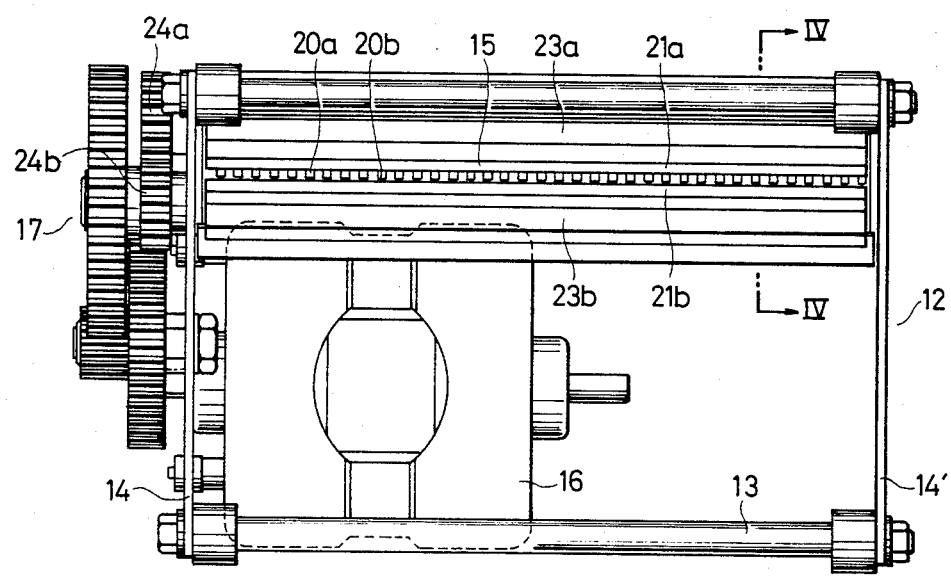
FIG. 3 is a plan view of a shredding mechanism in the shredder illustrated in FIG. 2.
Figure 4:
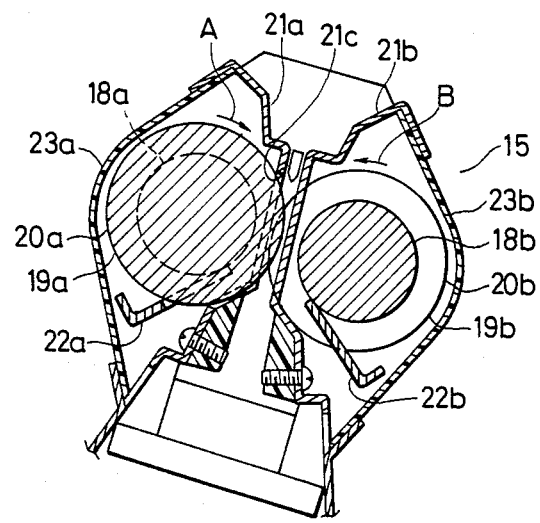
FIG. 4 is an enlarged cross-sectional view taken along line IV—IV of FIG. 3.

In FIGS. 2 through 4, the shredder proper 2 comprises a housing 4 made of a plastics material and composed of an upper casing 6 and a lower casing 5 which are coupled to each other. The lower casing 6 is in the form of a deep box having an upper opening, and includes an outlet or discharge opening 7 which opens downwardly. The upper casing 6 serves as a cover that closes the upper opening of the lower casing 5, and has an inlet opening 8 located upwardly of the discharge opening 7 and tapered downwardly toward the discharge opening 7, the inlet opening 8 being defined between a pair of opposite walls spaced a distance which becomes progressively smaller downwardly. The upper casing 6 also includes a handle 9 guided by a support rod 10 so as to move upwardly and downwardly with respect to the housing 4. A switch unit 11 is disposed below and supported by the upper casing 6. The housing 4 accommodates therein a shredding mechanism 12.

The shredding mechanism 12 comprises a pair of chassis plates 14, 14' (FIG. 3) of iron which are rigidly coupled to each other by a plurality of connector bars or rods 13, a cutter or shredder unit 15, a motor 16, and a speed reducer mechanism 17 for transmitting rotative power from the motor 16 to the cutter unit 15 at a reduced rate of speed. The cutter unit 15, the motor 16, and the speed reducer mechanism 17 are supported on the assembled chassis plates 14, 14'.

The cutter unit 15 comprises a pair of rotary cutters 20a, 20b having on respective shafts 18a, 18b thereof a pair of groups of circular cutter blades 19a, 19b, respectively, disposed in concentric relation to the shafts 18a, 18b. The circular cutter blades 19a or 19b in each group are spaced in the axial direction of the shaft 18a or 18b. The rotary cutters 20a, 20b are axially displaced with respect to each other such that the circular cutter blades in one group are radially aligned with spaces between adjacent circular cutter blades in the other group. Each of the circular cutter blades 19a, 19b is of a diameter larger than the distance between the axes of the shafts 18a, 18b, by a distance by which the circular cutter blades in one group project radially into the spaces between adjacent circular cutter blades in the other group. Thus, the groups of circular cutter blades 19a, 19b are peripherally overlapped in interspaced relation with each other. Each of the shafts 18a, 18b of the rotary cutters 20a, 20b has opposite ends rotatably journalled by the chassis plates 14, 14'.

As best shown in FIG. 4, the cutter unit 15 includes a pair of guides 21a, 21b for guiding a material to be shredded from the inlet opening 8 into an area wherein the circular cutter blades 19a, 19b interdigitate with each other and for guiding shredded pieces toward the discharge opening 7. Each of the guides 21a, 21b has a plurality of vertical slits or grooves 21c through which the peripheries of the circular cutter blades 19a or 19b project. A pair of scraper plates 22a, 22b serve to remove shreds from the shafts 18a, 18b, respectively, during shredding operation. A pair of shrouds 23a, 23b extend respectively over the backs of the rotary cutters 20a, 20b to prevent small shredded pieces from flying into the housing 4.

The speed reducer mechanism 17 is composed of a chain of meshing gears, the final one of which is held in driving mesh with one of gears 24a, 24b which are attached respectively to ends of the shafts 18a, 18b of the rotary cutters 20a, 20b.

Figure 5:
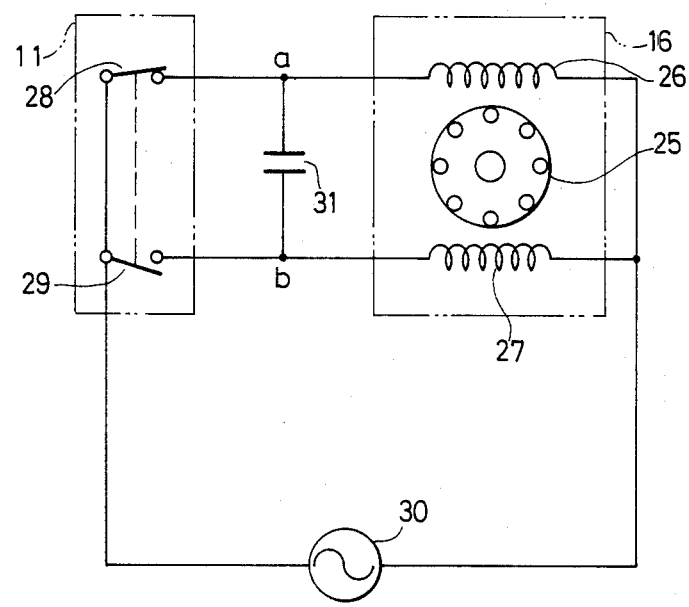
FIG. 5 is a circuit diagram of an electrical circuit for controlling a motor.

An electrical control circuit including the switch unit 11 and the motor 16 will be described with reference to FIG. 5. The motor 16 has a rotor 25, a main winding 26 and an auxiliary winding 27, the auxiliary winding 27 having more wire convolutions or turns than those of the main winding 26. The switch unit 11 has a normal rotation switch 28 through which the main winding 26 is connected to an a.c. power supply 30, and a reverse rotation switch 29 thrbugh which the auxiliary winding 27 is connected to the a.c. power supply 30. A capacitor 31 has one terminal coupled to a junction a between the main winding 26 and the normal rotation switch 28, and the other terminal coupled to a junction b between the auxiliary winding 27 and the reverse rotation switch 29. The normal and reverse rotation switches 28, 29 are actuatable respectively by a start pushbutton 32 and a stop and reverse pushbutton 33 (FIG. 1) mounted on an upper surface of the housing 4.

When the start pushbutton 32 is depressed to close the normal rotation switch 28, the motor 16 starts rotating in a normal direction, and rotative power from the motor 16 is transmitted through the speed reducer mechanism 17 and the gears 24a, 24b to the rotary cutters 20a, 20b, whereupon the rotary cutters 20a, 20b rotate in the opposite directions indicated by the arrows A, B (in FIG. 4), respectively. When a material such as a sheet or sheets of paper as inserted through the inlet opening 8 and guided by the guides 21a, 21b reaches the cutter unit 15, the material is shredded into small pieces by the overlapped or interspaced peripheral portions of the circular cutter blades 19a, 19b of the rotary cutters 20a, 20b as they rotate. The shredded pieces are discharged through the outlet opening 7 into the dust box 1. At this time, the guides 21a, 21b function to remove any small shreds which would otherwise get entangled with the rotary cutters 20a, 20b and hence the shafts 18a, 18b. Even if such shreds found their way through the slits 21c in the guides 21a, 21b along the surfaces of the circular cutter blades 19a, 19b, and became caught around the shafts 18a, 18b, the shredded pieces could be scraped off the shafts 18a, 18b by the scraper plates 22a, 22b.

When a material is jammed between the rotary cutters 20a, 20b and prevents rotation thereof, the stop and reverse pushbutton 33 is depressed to close the reverse rotation switch 29. The motor 16 now starts rotating in the reverse direction, and the rotary cutters 20a, 20b are simultaneously caused thereby to rotate in the directions opposite to those indicated by the arrows A, B in FIG. 4. Rotation of the rotary cutters 20a, 20b in the reverse directions enables the material to be released of locking engagement with the rotary cutters 20a, 20b, and forces the material as freed back to the inlet opening 8. With the motor 16 designed to generate a larger torque during the reverse rotation than that during the normal rotation, the rotary cutters 20a, 20b can reliably be rotated in the reverse directions, and hence can easily be released from a biting engagement with the material.

Operation of the motor 16 will be described in more detail with reference to FIG. 5. When the normal rotation switch 28 is closed, there are completed two electrical circuits, that is, a first closed circuit from the a.c. power supply 30 to the normal rotation switch 28 to the main winding 26 back to the a.c. power supply 30, and a second closed circuit from the a.c. power supply 30 to the normal rotation switch 28 to the capacitor 31 to the auxiliary winding 27 back to the a.c. power supply 30. Assuming that the capacitor 31 has a capacitance of 25 μF, an electric current Im of 1.55A flows through the first circuit, and an electric current Id of 0.86A flows through the second circuit. Where an electric current of 1.57A flows through the a.c. power supply 30, a phase angle $\theta$ between the currents Im, Id is 110°.

A torque Ts produced during rotation of the motor can generally be given by the following equation:

$$Ts = 2\alpha \cdot Im \cdot Id \cdot R2 \sin \theta$$

where $\alpha$ is a constant and R2 is the secondary resistance.

A torque Ts1 generated during normal rotation is expressed by:

$$Ts1 = 2\alpha \times 1.55 \times 0.86 \times R2 \times \sin 110°$$
$$= 4.05 \times R2$$

When the reverse rotation switch 29 is closed, there are completed a third closed circuit from the a.c. power supply 30 to the reverse rotation switch 29 to the capacitor 31 to the main winding 26 back to the a.c. power supply 30, and a fourth closed circuit from the a.c. power supply 30 to the reverse rotation switch 29 to the auxiliary winding 27 back to the a.c. power supply 30. Provided an electric current Im of 3.41A flows through the third circuit, an electric current Id of 0.87 flows through the fourth circuit, and an electric current of 3.58 flows through the a.c. power supply 30, a phase angle $\theta$ between the currents Im, Id is 86°.

A torque Ts2 generated during reverse rotation is given by the following equation:

$$Ts2 = 2\alpha \times 3.4 \times 0.87 \times R2 \times \sin 86°$$
$$= 9.56 \times R2$$

As a result, the ratio P between the torque Ts1 and the torque Ts2 is:

$$P = \frac{Ts2}{Ts1} = \frac{9.56 \times R2}{4.05 \times R2} = 2.36$$

Therefore, the torque Ts2 generated upon reverse rotation of the motor 30 is 2.36 times the torque Ts1 produced upon normal rotation of the motor 30. With the larger torque generated by the motor 30 when the latter rotates in the reverse direction, the rotary cutters 20a, 20b can reliably be unlocked out of engagement with the material being shredded.

As illustrated in FIGS. 6(a) through 6(d), the switch unit 11 comprises a frame 34 including a pair of spaced horizontal upper and lower plates 35, 36 through which vertically movably extend a pair of spaced vertical first and second levers 37, 38 having on upper ends thereof the start pushbutton 32 and the stop and reverse pushbutton 33, respectively. The first and second levers 37, 38 have lateral projections 39, 40, respectively, positioned immediately below the upper plate 35, and also have actuators 41, 42, respectively, made of an insulating material and affixed to lower end portions of the levers 37, 38. The actuator 41 on the lever 37 is interlinked for coaction with the normal rotation switch 28 (FIG. 5), and the actuator 42 on the lever 38 is interlinked for coaction with the reverse rotation switch 29. The levers 37, 38 are normally biased to move upwardly by springs 43, 44, respectively, acting between the lower plate 36 and the actuators 41, 42.

A locking lever 45 is horizontally movably supported on the frame 34 and disposed beneath the upper plate 35. The locking lever 45 has on its upper edge a hook or cam follower 47 having an upper slanted surface 46 and an unlocking projection 50 having an upper slanted surface 48 and a horizontal surface 49 extending from a lower end of the slanted surface 48. The hook 47 and the unlocking projection 50 are spaced from each other by a distance substantially equal to the distance between the levers 37, 38. The slanted surfaces 46, 48 are inclined in the same direction. The locking lever 45 is normally urged to move leftward as shown by a spring 51 acting between the locking lever 45 and the frame 34.

Figure 6A:
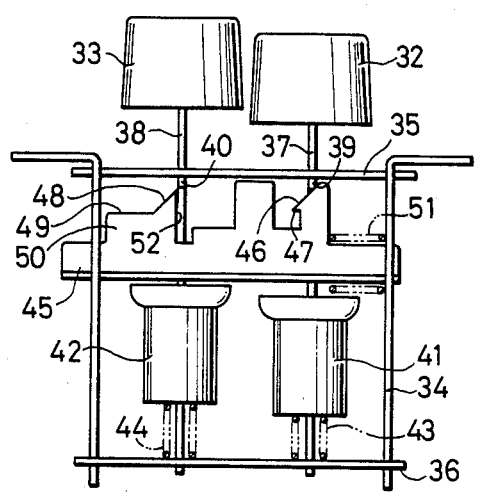
FIGS. 6(a) through 6(d) are side elevational views of a switch unit, showing progressive steps of operation of the switch unit.

When the switch unit 11 is not actuated as shown in FIG. 6(a), the locking lever 45 is biased in the leftward position under the force of the spring 51, the lateral projection 39 on the first lever 37 is positioned at an upper portion of the slanted surface 46 of the hook 47, and the lateral projection 40 on the second lever 38 is held in vertical registry with a vertical slot 52 defined adjacent to the slanted surface 48 of the unlocking projection 50 remotely from the horizontal surface 49 thereof. The slot 52 has a height larger than the height of the horizontal surface 49.

Figure 6B:
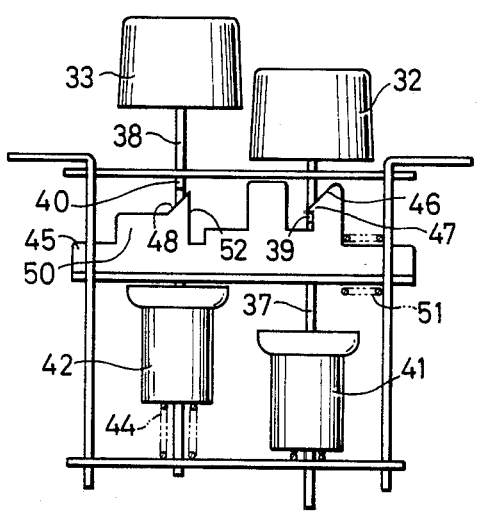

When the start pushbutton 32 is depressed to lower the first lever 37 against the bias of the spring 43, the lateral projection 39 on the first lever 37 engages and pushes the slanted surface 46 of the hook 47, whereupon the locking lever 45 is displaced to the right as shown in FIG. 6(b). As the lateral projection 39 is lowered past the slanted surface 46, the projection 39 is engaged by a lower edge of the hook 47 under the return force of the spring 51. The first lever 37 now remains in the lowered position as shown in FIG. 6(b) by engagement with the hook 47. Upon descending movement of the first lever 37, the actuator 41 thereon closes the normal rotation switch 28 ganged therewith. At this time, the lateral projection 40 on the second lever 38 overlies an upper portion of the slanted surface 48 of the unlocking projection 50.

Thereafter, depression of the stop and reverse pushbutton 33 causes the lateral projection 40 on the second lever 38 to push the slanted surface 48 laterally to displace the locking lever 45 to the right, allowing the projection 39 on the first lever 37 to disengage from the hook 47. The first lever 37 now returns upwardly to the starting or unactivated position under the resiliency of the spring 43, whereupon the normal rotation switch 28 is turned off.

Figure 6C:
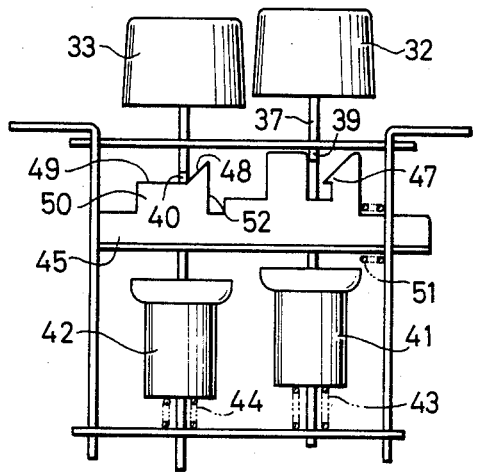

Downward movement of the second lever 38 is stopped when the projection 40 slides down the slanted surface 48 into abutting engagement with the horizontal surface 49 (FIG. 6(c)). At this time, the actuator 42 on the second lever 38 has not travelled a downward stroke sufficiently large to close the reverse rotation switch 29. Accordingly, the motor 30 is de-energized, but does not yet start reversing.

Figure 6D:
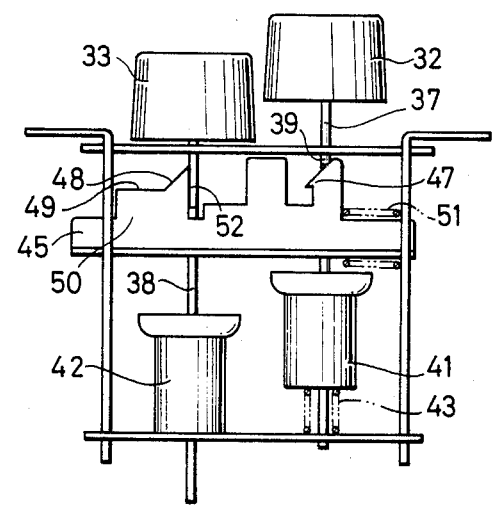

Thereafter, the second lever 38 is released of a downward push so as to be allowed to move upwardly to the starting position under the resiliency of the spring 44. The locking lever 45 now returns to the leftward position as illustrated in FIG. 6(a) under the biasing force from the spring 51, with the lateral projection 40 on the second lever 38 being in vertical registry with the slot 52 adjacent to the unlocking projection 50. When the second lever 38 is pushed again downwardly at this time, it is permitted to descend until the projection 40 hits the bottom of the slot 52, as shown in FIG. 6(d). The bottom of the slot 52 is lower than the horizontal surface 49 by a distance large enough for the actuator 42 to travel for turning on the reverse rotation switch 29. Upon closing of the reverse rotation switch 29, the motor 16 starts rotating in the reverse direction. The motor 16 will continue to rotate in the reverse direction as long as the second lever 38 is depressed.

Thus, in order to close the reverse rotation switch 29 after the normal rotation switch 28 has been switched on, it is necessary to depress the stop and reverse pushbutton 33 twice. Such an arrangement will provide a certain interval of time or a time delay before the motor 16 starts rotating in the reverse direction. Stated otherwise, the motor 16 is prevented from being reversed immediately after it has rotated in the normal direction, and hence no undue force is applied to the motor 16 and the speed reducer 17. Furthermore, there is no danger of closing the two switches 28, 29 at the same time, even momentarily.

Figure 7:
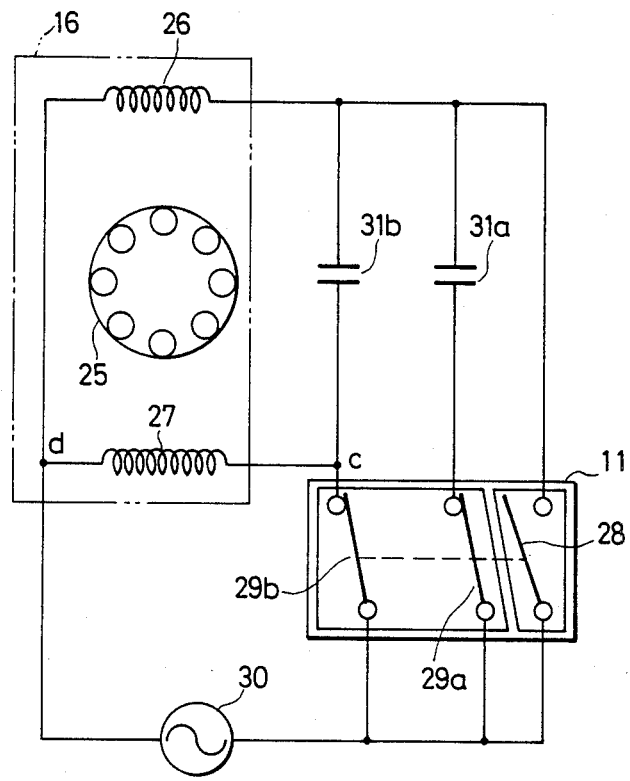
FIG. 7 is a circuit diagram of an electrical circuit for controlling a motor according to another embodiment of the present invention.

FIG. 7 shows a modified electric circuit for the motor 16. The electric circuit includes a main winding 26 of the motor 16, which is connected to an a.c. power supply 30 via a normal rotation switch 28. A pair of reverse rotation switches 29a, 29b that are ganged with each other are connected respectively in series with a pair of first and second capacitors 31a, 31b. The series-connected switch 29a and capacitor 31a and the other series-connected switch 29b and capacitor 31b are connected in parallel to each other and to the normal rotation switch 28. The motor 16 also has an auxiliary winding 27 having one terminal coupled to a junction c between the second reverse rotation switch 29b and the second capacitor 31b, and the other terminal coupled to a junction d between the main winding 26 and the a.c. power supply 30.

When the normal rotation switch 28 is closed, there are completed a first closed circuit from the a.c. power supply 30 to the normal rotation switch 28 to the main winding 26 back to the a.c. power supply 30, and a second closed circuit from the a.c. power supply 30 to the normal rotation switch 28 to the second capacitor 31b to the auxiliary winding 27 back to the a.c. power supply 30. An electric current $I_2$ flowing through the second circuit has an advanced phase corresponding to the capacitance of the second capacitor 31b with respect to an electric current $I_1$ flowing through the first circuit. When the normal rotation switch 28 is turned off and the first and second reverse rotation switches 29a, 29b are closed, there are completed a third closed circuit from the a.c. power supply 30 to the first and second reverse rotation switches 29a, 29b to the capacitors 31a, 31b to the main winding 26 back to the a.c. power supply 30, and a fourth closed circuit from the a.c. power supply 30 to the second reverse rotation switch 29b to the auxiliary winding 27 back to the a.c. power supply 30. An electric current $I_3$ that flows through the third circuit has an advanced phase corresponding to the combined capacitance of the first and second capacitors 31a, 31b with respect to an electric current $I_4$ that flows through the fourth circuit.

The current flowing through the main winding 26 and the current flowing through the auxiliary winding 27 have phase angles which are larger upon reverse rotation of the motor 16 than upon normal rotation thereof. Accordingly, the motor 16 produces a larger torque when rotating in the reverse direction than that generated when rotating in the normal direction.

Instead of the electrical means described for enabling the motor 16 to produce different torques upon rotation in opposite directions, the speed reducer 17 may be provided with a mechanical means for enabling the rotary cutters 20a, 20b to rotate with different torques when rotating in opposite directions. More specifically, the speed reducer 17 may have a clutch for providing different reduction gear ratios, that is, a smaller reduction gear ratio upon rotation in the reverse direction than upon rotation in the normal direction. The reduction gear ratios thus selected cause the rotary cutters 20a, 20b to produce a larger torque while rotating in the reverse direction than that while rotating in the normal direction.

Although certain preferred embodiments have been shown and described in detail, it should be understood that various changes and modifications may be made therein without departing from the scope of the appended claims.

What is claimed is:

1. A shredder comprising:
a pair of rotary cutters for shredding a material therebetween;
a speed reducer;
a motor mounted rotatable in one direction for rotating said rotary cutters through said speed reducer in one direction to shred the material and also rotatable in an opposite direction for rotating said rotary cutters through said speed reducer in a reverse direction to unload the material from said rotary cutters;
a switch means for activating said motor to rotate selectively in said one and opposite directions; and
means connected to said motor for rotating said rotary cutters with a larger torque in said reverse direction than that in said normal direction,
said means for rotating comprising an electrical control circuit for enabling said motor to produce a substantially constant torque in said opposite direction which is larger than the torque provided when rotating in said one direction, said electrical control circuit comprising a power supply, main and auxiliary windings of said motor connected in parallel to said power supply, and phase control means connected between said main and auxiliary windings for producing a difference between the phase of an electric current flowing through said main winding and the phase of an electric current flowing through said auxiliary winding, said motor providing said substantially constant torque as a function of said phase difference, said switch means being connected in said electrical control circuit to selectively connect said phase control means to said power supply such that said difference in phase is larger while said motor is rotating in said opposite direction than while said motor is rotating in said one direction.

2. A shredder according to claim 1, wherein said switch means includes a first switch for connecting said motor to rotate in said one direction and a second switch for connecting said motor to rotate in said opposite direction, said main winding being connected to said power supply through said first switch, said auxiliary winding being connected to said power supply through said second switch, and said phase control means comprising a having one terminal thereof coupled to a junction between said first switch and said main winding and another terminal thereof coupled to a junction between said second switch and said auxiliary winding.

3. Apparatus as in claim 1 further comprising time delay means for delaying activation of said motor in said opposite direction in response to activation of said switch means.

4. Apparatus as in claim 3 wherein said time delay means comprises a mechanical interlocking means connected to first and second pushbuttons of said activating means for requiring, when said first pushbutton is engaged for activating said motor means to drive said shredding means in a first direction, said second pushbutton to be activated a first time for disengaging said first pushbutton and a second time for activating said motor means to drive said shredding means in said reverse direction.

5. A shredder comprising:

a pair of rotary cutters for shredding a material therebetween;

a speed reducer;

a motor mounted rotatable in one direction for rotating said rotary cutters through said speed reducer in one direction to shred the material and also rotatable in an opposite direction for rotating said rotary cutters through said speed reducer in a reverse direction to unload the material from said rotary cutters;

a switch means for activating said motor to rotate selectively in said one and opposite directions; and means connected to said motor for rotating said rotary cutters with a larger torque in said reverse direction than that in said normal direction, said means for rotating comprising an electrical control circuit for enabling said motor to produce a substantially constant torque in said opposite direction which is larger than the torque provided when rotating in said one direction, said electrical control circuit comprising a power supply, main and auxiliary windings of said motor connected in parallel to said power supply, and a phase control means for producing a difference between the phase of an electric current flowing through said main winding and the phase of an electric current flowing through said auxiliary winding and for causing said motor to provide a substantially constant torque dependent on said phase difference, said switch means being connected in said electrical control circuit to selectively connect said phase control means to said power supply such that said difference in phase and said torque dependent thereon are larger while said motor is rotating in said opposite direction than while said motor is rotating in said one direction.

6. A shredder according to claim 5, wherein said phase control means comprises first and second capacitors, said switch means includes a normal rotation switch for rotating said motor in said one direction and a pair of first and second switches ganged with each other for rotating said motor in said opposite direction, said main winding being connected via said normal rotation switch to said power supply, said first switch and said first capacitor, and said second switch and said second capacitor being connected in series with each other, respectively, and parallel to said normal rotation switch, and said auxiliary winding having one terminal coupled to a junction between said main winding and said power supply and the other terminal coupled to a junction between said second switch and said second capacitor.

7. A shredder comprising:

a pair of rotary cutters for shredding a material therebetween;

a speed reducer;

a motor mounted rotatable in one direction for rotating said rotary cutters through said speed reducer in one direction to shred the material and also rotatable in an opposite direction for rotating said rotary cutters through said speed reducer in a reverse direction to unload the material from said rotary cutters;

a switch means for activating said motor to rotate selectively in said one and opposite directions;

said switch means including time delay means for generating a time delay while switching between rotation of said motor in said one direction and rotation of said motor in said opposite direction;

means connected to said motor for rotating said rotary cutters with a larger torque in said reverse direction than that in said normal direction, said switch means including a first switch for rotating said motor in said one direction and a second switch for rotating said motor in said opposite direction, said time delay means comprising a first lever having on one end a first pushbutton for actuating said first switch, a second lever having on one end a second pushbutton for actuating said second switch, and a locking lever having a hook responsive to depression of said first pushbutton for engaging said first lever when actuated, and an unlocking projection responsive to depression of said second pushbutton for releasing said first lever from engagement with said hook, said locking lever being movable among two positions in which said first lever is released from engagement with said hook and a third position in which said first lever is retained by said hook, said unlocking projection having a surface for preventing actuation of said second lever when said locking lever is in said first or third position before said locking lever returns to said second position, and said locking lever having a slot adjacent to said unlocking projection for receiving therein when in said second position said second lever as fully actuated to close said second switch.

8. A shredder according to claim 7, said switch means having a frame on which said first and second levers, and said locking lever, are movably mounted, first and second springs acting between said frame and said first and second levers, respectively, for urging said first and second levers to inactive positions thereof, and a third spring acting between said frame and said locking lever for urging said locking lever to said second position.

9. A shredder according to claim 8, wherein said hook and said unlocking projection have slanted surfaces, respectively, slidably engageable with said first and second levers, respectively, to displace said locking lever toward said third position against the resiliency of said third spring, and said first lever being disengageable from said hook upon slidable engagement of said second lever with said slanted surfaces of said unlocking projection.

* * * * *